United States Patent [19]

Dantowitz

[11] 4,043,858
[45] Aug. 23, 1977

[54] PLASTIC NAME TAG HOLDER

[75] Inventor: Edward Dantowitz, Chestnut Hill, Mass.

[73] Assignee: Albany Novelty Mfg. Co., Boston, Mass.

[21] Appl. No.: 657,072

[22] Filed: Feb. 11, 1976

Related U.S. Application Data

[62] Division of Ser. No. 586,508, June 12, 1975, Pat. No. 3,969,063.

[51] Int. Cl.² .................. B29C 17/00; B29D 23/00
[52] U.S. Cl. .................... 156/251; 156/253; 156/267; 156/272; 156/273; 156/277; 156/292; 156/306; 156/311; 264/25; 264/161; 264/248; 264/285; 264/320
[58] Field of Search .............. 264/25, 26, 138, 160, 264/153, 163, 248, 154, 155, 285, 320; 156/250, 251, 253, 267, 272, 273, 292, 311, 380, 515, 384, 306, 277

[56] References Cited

U.S. PATENT DOCUMENTS

| | | | |
|---|---|---|---|
| 2,347,439 | 4/1944 | Shea et al. | 156/292 |
| 2,364,870 | 12/1944 | Otto | 156/292 |
| 2,429,123 | 10/1947 | Crowley | 156/292 |
| 2,455,215 | 11/1948 | Beckwith et al. | 156/292 |
| 3,026,233 | 3/1962 | Scholl | 156/251 |
| 3,558,381 | 1/1971 | Colianni | 156/251 |

Primary Examiner—Willard E. Hoag
Attorney, Agent, or Firm—Thompson, Birch, Gauthier & Samuels

[57] ABSTRACT

This invention includes a plastic name tag holder; a method for manufacturing said name tag holder; and apparatus for manufacturing said name tag holder. The preferred name tag holder is rectangular and has a central cavity open at one end for insertion of the name tag. The holder has a rigid plastic bottom sheet and a rigid plastic parallel top sheet which is turned down around three sides of its periphery and is sealed to the bottom sheet on three sides to provide the central name tag slot. The slot is substantially rectangular in vertical cross-section.

The apparatus and method of manufacturing a plurality of name tag holders include hinged horizontal insert fingers mounted on the lower platen to separate the top and bottom vinyl sheets and to provide a plurality of male molds corresponding to the central cavities. A plurality of U-shaped electrode dies draws the top sheet down and around the U-shaped insert fingers and seals the top sheet to the bottom sheet beyond the perimeter of the insert fingers. The electrode dies also cut the top and bottom sheets between the insert fingers so that after the sealing and cutting are completed, the operator can strip away the waste with one motion and can then remove the completed name tag holders from the insert fingers.

12 Claims, 7 Drawing Figures

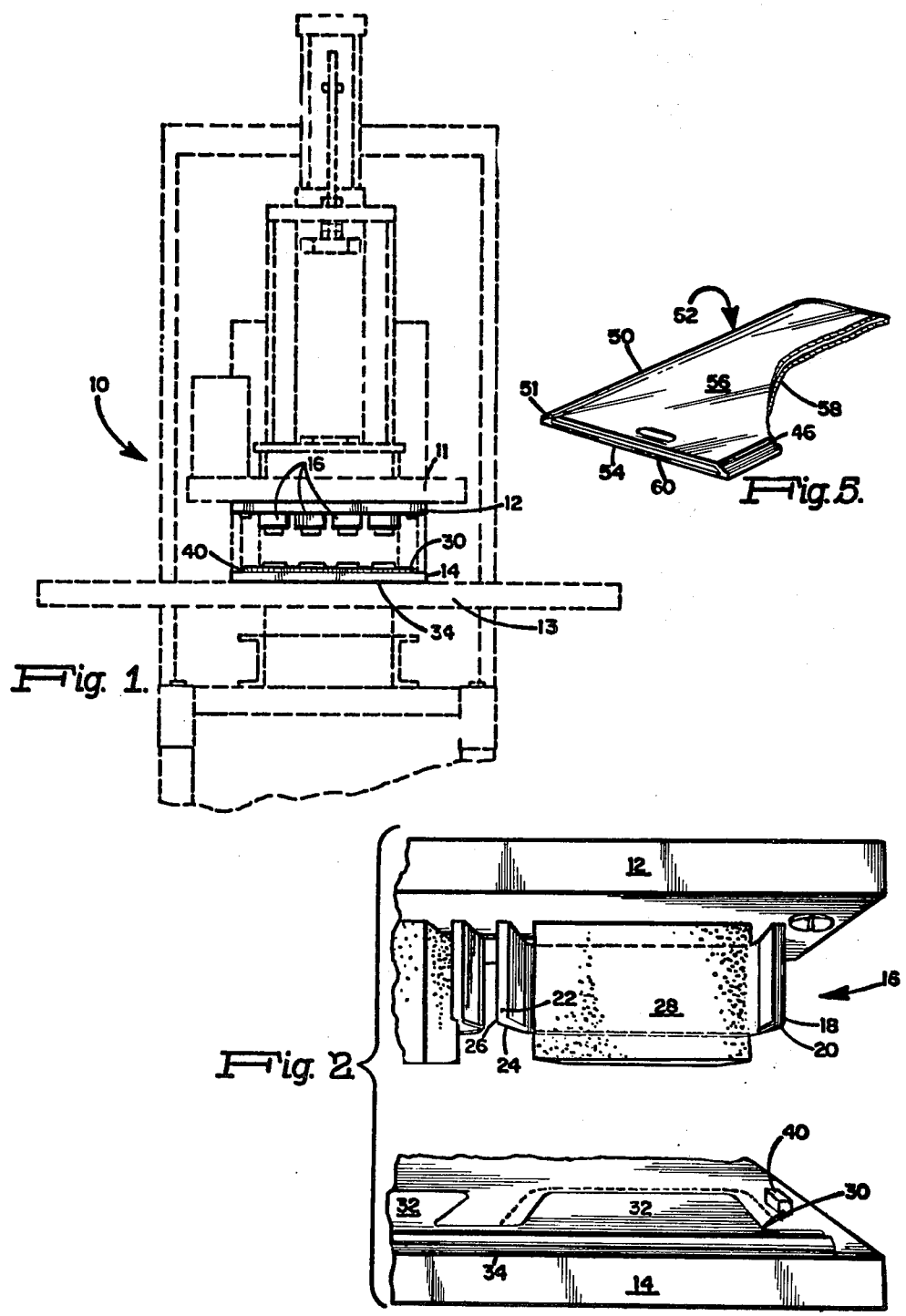

4,043,858

PLASTIC NAME TAG HOLDER

This is a division of application Ser. No. 586,508 filed June 12, 1975 now U.S. Pat. No. 3,969,063.

BACKGROUND OF THE INVENTION

Plastic name tag holders, such as are used on luggage, are usually formed by placing an insert between two flat plastic sheets, electronically heat sealing the sheets around the insert periphery, and then removing the insert. The sealing is effected by opposed flat energized surfaces. This type of tag holder has a small almond-shaped pocket or cavity into which a name tag or card may be inserted. The sealed edges are flat and the central cavity has a diminishing vertical cross-sectional area or "pinched effect" as it approaches the sealed edges. The use of flat plastic sheets limits the height of the insert that may be used, and makes the name tag insertion process quite difficult. These problems exist whether or not the plastic sheets are soft, semi-rigid, or rigid.

SUMMARY OF THE INVENTION

It is an object of this invention to provide a plastic name tag holder which has parallel top and bottom rigid sheets.

It is another object of this invention to provide apparatus for sealing a plurality of name tag holders simultaneously.

It is another object of this invention to provide a method of manufacturing name tag holders which is fast, efficient, inexpensive, simple, and long-lasting.

The preferred name tag holder has parallel flat top and bottom sheets and has a substantially rectangular vertical cross-section. A slot is provided for a fastening strap and the edges and corners are smoothed and rounded, respectively.

The preferred apparatus and method include a lower platen, hinged flat insert fingers, having U-shaped perimeters, mounted on the lower platen, and several U-shaped electrode dies mounted on the upper platen and being heated and electrically energized to produce a radio frequency signal for sealing purposes. Rigid plastic top and bottom sheets are placed above and below the insert fingers, respectively, and the electrode dies are lowered to draw the top sheet down and around the insert fingers (with the assistance of compression blocks which maintain the top sheet flat against the upper surfaces of the insert fingers). The dies seal the top and bottom sheets together around three sides of the insert fingers and cut the sealed sheets between the fingers by forming a so-called tear line. The dies are raised, the scrap is stripped away with one motion, and the name tag holders are removed from the fingers, ready for slotting (for a fastening strap) and for edge smoothing, if necessary.

The insert fingers determine the central cavity shape and dimensions, and also hold the sealed name tag holders in place while the scrap material is being stripped away.

DESCRIPTION OF THE DRAWINGS

FIG. 1 is a front elevation of the dielectric sealing machine showing the preferred embodiment of the manufacturing apparatus attached to the upper and lower mounting plates of the sealing machine.

FIG. 2 is a front perspective view of a portion of the electrode dies, the compression blocks, and the hinged insert fingers.

FIG. 5 is a perspective view, partly cut away, showing the completed name tag holder of this invention.

DESCRIPTION OF THE PREFERRED EMBODIMENT

Figure 3A:
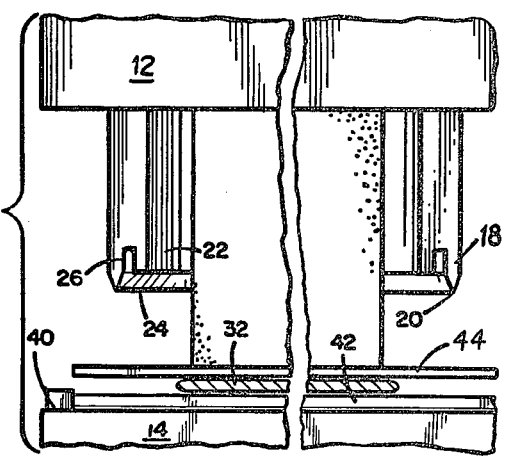
FIGS. 3a, b, and c are front elevations illustrating the sequential steps of sealing and cutting the name tag holder.

FIG 1 shows (in dotted outline) a conventional dielectric sealing machine 10 of the type currently obtainable from Cosmos Electronic Machine Corp. of New York. N.Y. Such a machine has the following operating characteristics: 220 AC volts; 60 AC amps/leg; 50–60 cycle AC frequency; 96 power factor; 10 KW HF output power; 27.12 MC high frequency; and 3 Phase. The sealing machine has a conventional upper mounting plate 11 and a lower mounting plate 13.

An upper platen 12 and a lower platen 14 are secured to the upper mounting plate 11 and the lower mounting plate 13, respectively. Plate 11 and platen 12 are electrically and thermally connected together and are conductive.

A plurality of electrode dies 16 is secured to the upper platen 12. Preferably, there are a total of eight dies arrayed in two opposing lines of four dies each. As shown in FIG. 2, each die 16 has a U-shape and has a downwardly extending peripheral portion which is divided into an outer periphery 18 terminating in a sharp cutting edge 20, and an inner periphery 22 terminating in a flat sealing edge 24. A clearance space 26 divides the inner periphery 22 and its sealing edge 24 from the outer periphery 18 and its cutting edge 20. All of elements 18, 20, 22, 24 and 26 are U-shaped in horizontal cross-section and it will be noted that the plane of cutting edge 20 is vertically lower than the plane of sealing edge 24. Die 16 can be described as a tear seal die with a step between the upper sealing edge and the lower cutting edge.

Also secured to upper platen 12 is a compression block 28. This block is preferably a block of non-conductive polyurethane foam, and the plane of its flat lower bearing surface, when uncompressed, is vertically below the plane of cutting edge 20. In the preferred arrangement of eight U-shaped electrode dies 16 (the bottoms of four U's being adjacent to the bottoms of the other four U's), there are eight foam blocks 28 within the eight dies 16. Thus, there are two rows of foam blocks, four blocks in each row.

Figure 4:
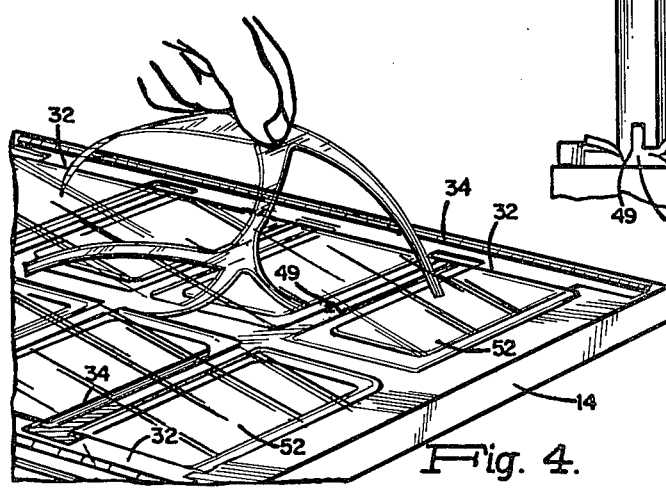
FIG. 4 is a perspective view showing the manual stripping of excess sheet materials after the name tag holders have been sealed and cut.

Referring now to FIGS. 2 and 4, it will be seen that a male mold assembly 30 is mounted on the lower platen 14 and consists of two hinges 34 having four hinge sections. Two of the hinge sections are quite small and are bolted to the lower platen 14. The other two hinge sections each have the form of four pivotable insert fingers 32, preferably made of brass or other easily formed material. The insert fingers have U-shaped perimeters, the bottoms of which are adjacent to each other in two rows of four (see FIG. 4). Preferably, each finger is approximately 46 mm. wide and 1 mm. thick.

The hollow U-shaped dies 16 are slightly wider (horizontally) than are the insert fingers 32 and are in vertical registration with them. Thus, when the two platens are moved vertically towards each other, the inner periphery 22 of the die 16 passes to the outside of the outer perimeter of the insert finger 32. In other words, each insert finger 32 fits within the hollow of each die 16.

The operation of the dielectric sealing machine will now be described so that the method of manufacturing the plastic name tag holders will be understood. The machine is initially placed in its start position with mounting plates 11 and 13 moved to their positions of maximum vertical separation. Then, insert fingers 32 are lifted and the bottom plastic sheet 42 is placed on lower platen 14 between alignment blocks 40. The insert fingers are then lowered to the horizontal and the top plastic sheet 44 is placed over the insert fingers within the confines of alignment blocks 40.

Preferably, bottom sheet 42 is a rigid polyvinyl sheet having a thickness of approximately 1 mm. and is either opaque or transparent. However, the range of bottom sheet thicknesses could certainly run from approximately 0.1 mm. to 4 mm. Preferably, top sheet 44 is also a rigid polyvinyl sheet having a thickness of approximately 0.5 mm. and is transparent. However, the range of top sheet thickness could certainly run from approximately 0.25 mm. to 1 mm. These ranges are not intended to be limitations and are mentioned merely as examples.

Figure 3B:
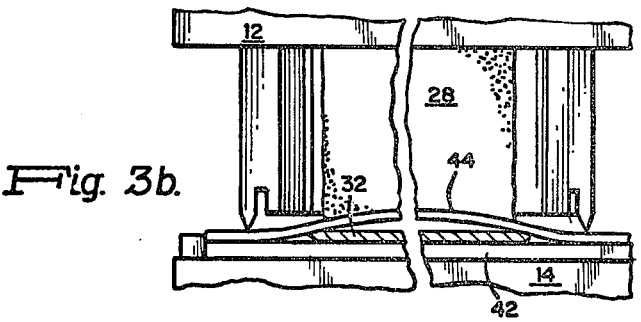

The upper mounting plate 11 is then lowered, thereby bringing the foam compression block 28 down into contact with top vinyl sheet 44 (see FIG. 3a). As the foam block compresses, sheet 44 is held downwardly against the insert finger 32 and is stabilized against lateral movement. The upper mounting plate continues to be lowered so that the cutting edge 20 of die 16 contacts top sheet 44 and presses it against bottom sheet 42 (see FIG. 3b). This causes the top vinyl sheet 44 to bow upwardly to a limited extent.

At this point, the sealing step is begun. The dielectric sealing machine 10 has energized the electrode die 16 so that it is heated to a thermostatically controlled temperature of 110° to 120° C. This enables the cutting edge 20 to easily sink downwardly into the overlying top and bottom sheets while simultaneously heating and softening the sheets themselves. This permits the top sheet to be urged back into the shown horizontal attitude.

The sealing edge 24 has meanwhile drawn the top sheet down around the U-shaped perimeter of the insert finger 32 and has flattened the perimeter of the top sheet horizontally against the bottom sheet. The heated dies and their sealing edges are then energized with a high frequency radio signal by the generator of the sealing machine so that the sealing edges act as electrodes to seal the top sheet to the bottom sheet with a U-shaped bond. A satisfactory electrode operating signal is produced when the sealing machine 10 has a power factor of 96, a frequency of 27.12 MC, and a three-phase signal.

Figure 3C:
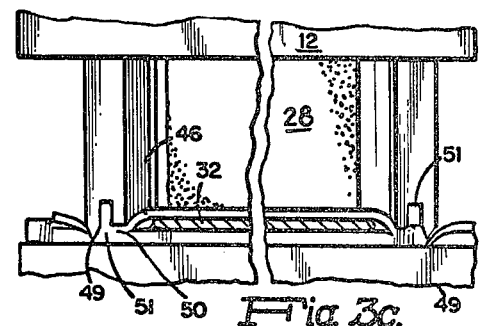

FIG. 3c shows the sealing step position. The cutting edge has substantially cut through the top and bottom sheets to form a U-shaped tear line 49. The heated sealing edges have been electronically energized for a time period of approximately 8 to 11 seconds to soften and bond the top sheet to the bottom sheet in the perimeter area 50. The bonding action has caused the plastic to flow and to form a small continuous shoulder 51 in the clearance space 26 between the cutting edge and the sealing edge.

Best bonding results have been obtained when the radio frequency signal has been controlled to gradually increase in strength and then to gradually decrease in strength over the sealing period. During this time, the temperature is held constant. Then, after the sealing step has been completed, the HF signal is terminated, and the bonded sheets are permitted to cool for a period of 1 to 2 seconds.

FIG. 3c shows the top sheet 44 turned down around its perimeter area 46 and turned out around its perimeter area 50. For purposes of clarity, the drawings show a space between insert finger 32 and top sheet perimeter area 46, and also show perimeter area 46 to be somewhat curved. In fact, top sheet perimeter 46 is drawn down quite close to the insert finger 32 and becomes almost a vertical wall at right angles to top sheet 44 and bottom sheet 42.

After the sealing and cooling steps have been completed, the upper mounting plate is raised, thereby removing die 16 and foam block 38 from insert fingers 32. Now, the machine operator grasps the vinyl waste, as shown in FIG. 4, and strips it away in one continuous motion. The waste tears along tear lines 49 and leaves eight virtually completed name tag holders 52 still seated on the eight insert fingers. The name tag holders are then manually removed from the insert fingers.

FIG. 5 shows the completed holders 50 after they have been removed from the insert fingers. The central cavity or slot 54 is substantially rectangular in vertical cross-section with the top sheet 56 disposed parallel to bottom sheet 58. Side wall 46 is substantially vertical and is perpendicular to the top and bottom sheets. The name tag holder is substantially rectangular in plan view.

Several finishing operations may now be performed. A slot 60 may be punched vertically through the sheets 56 and 58 to accommodate a fastening strap. The peripheral edges may be smoothed and the corners rounded. Finally, advertisements or the like may be printed on the lower surface of bottom sheet 58. The name tag holder is now completed and ready for packing and shipping.

As a variation, instead of a single top and a single bottom sheet, two top and two bottom sheets could be used, one pair for each set of hinged insert fingers. Then, the operator would strip the waste in two separate motions.

In the preferred embodiment, polyvinyl chloride sheets of specified thicknesses were described. Such sheets would typically have a tensile strength of between 5–9,000 psi, a percentage elongation of from 2.0–40.0, a tensile modulus of from $3.5-6.0 \times 10^5$ psi, a compressive strength of from 8,000–13,000 psi, and an impact strength of 0.4–20.0 ft.-lb. per inch Izod test. Other sheet materials having the same general mechanical characteristics, such as other vinyl polymers and co-polymers (for example, vinyl chloride acetate, vinylidene chloride and ABS-modified vinyl chloride) may be substituted if carefully selected.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A method for manufacturing plastic name tag holders on a dielectric sealing machine comprising the following steps:

a. placing a bottom plastic sheet on the lower platen of the sealing machine;
b. overlying the bottom plastic sheet with at least one horizontal insert finger having a substantially U-shaped horizontal perimeter;
c. placing a top plastic sheet over the insert finger;
d. contacting the upper surface of the top sheet with a compression block to press said top sheet horizontally against the insert finger;
e. maintaining the compression block in engagement with the upper surface of the top sheet while contacting said top sheet with a horizontal substantially U-shaped electrode die, the substantially U-shaped inner periphery of said die being slightly wider than the substantially U-shaped perimeter of the insert finger, said die and said insert finger being in vertical telescopic registration, said die drawing said top sheet downwardly around the perimeter of said insert fingers and out wardly against the horizontal upper surface of the bottom sheet, said electrode die electronically sealing the top and bottom sheets together around the periphery of said insert finger; and
f. raising the electrode die from the top sheet and removing the completely sealed name tag holder from the insert finger, said name tag holder having a cavity formed by said insert finger between the top and bottom sheets in which the top sheet is parallel to the bottom sheet.

2. The method of claim 1 wherein a plurality of insert fingers are mounted on a common hinge which is secured to the underlying lower platen, said insert fingers hinging upwardly to permit the bottom plastic sheet to be placed on said lower platen and said insert fingers hinging downwardly to overly said bottom plastic sheet.

3. The method of claim 1 wherein the sealing step is performed over a time period within the range of 8 to 11 seconds.

4. The method of claim 1 wherein said electrode die seals the top and bottom sheets together by simultaneously heating them with a relatively constant heat and by electronically energizing them with a radio frequency signal.

5. The method of claim 1 further characterized by the step of vertically slotting the overlying top and bottom sheets to accommodate a fastening strap.

6. The method of claim 1 further characterized by the step of printing advertising or the like on the lower surface of the bottom sheet.

7. The method of claim 1 wherein said electrode die has a peripheral substantially U-shaped outer cutting edge in addition to the peripheral substantially U-shaped inner sealing edge, said cutting edge cutting said top and bottom sheets during the sealing step.

8. The method of claim 7 wherein after cutting, the remaining top and bottom sheet scrap is stripped away manually in a single tearing motion.

9. The method of claim 1 wherein during the sealing step the electrode die is heated to a constant temperature in the range of 110° to 120° C.

10. The method of claim 9 wherein the sealing step is followed by a cooling step, said sheets being cooled during said cooling step over a time period within the range of 1 to 2 seconds.

11. The method of claim 1 wherein during the sealing step the electrode die is electronically energized with a radio frequency signal.

12. The method of claim 11 wherein the strength of the radio frequency signal gradually increases and then decreases during the sealing step.

* * * * *